US006257732B1

(12) United States Patent
Takahagi et al.

(10) Patent No.: US 6,257,732 B1
(45) Date of Patent: Jul. 10, 2001

(54) METHOD FOR FORMING A METALLIC MIRROR SURFACE AND SOLUTIONS FOR THE SAME

(75) Inventors: Akihiro Takahagi; Yuji Kanomata, both of Iwaki (JP)

(73) Assignee: American Spray Coating, Murreita, CA (US)

( * ) Notice: Subject to any disclaimer, the term of this patent is extended or adjusted under 35 U.S.C. 154(b) by 0 days.

(21) Appl. No.: 09/408,831

(22) Filed: Sep. 29, 1999

(51) Int. Cl.[7] .................................................. G02B 5/08
(52) U.S. Cl. ......................... 359/883; 359/884; 359/900
(58) Field of Search ................................. 359/883, 884, 359/900; 427/601, 435, 444, 407.1

(56) References Cited

U.S. PATENT DOCUMENTS

| | | | |
|---|---|---|---|
| 3,877,998 | 4/1975 | Guhde | 148/6.15 |
| 4,065,626 | 12/1977 | Franz | 428/629 |
| 4,221,844 | 9/1980 | Hasenour | 428/623 |
| 4,463,038 | 7/1984 | Takeuchi et al. | 427/407.1 |
| 4,745,003 | 5/1988 | Sirkoch et al. | 427/54.1 |
| 5,055,537 * | 10/1991 | Kawata et al. | 526/240 |
| 5,262,242 | 11/1993 | Tomiyama et al. | 428/423.1 |
| 5,312,709 | 5/1994 | Kadokura et al. | 430/62 |
| 5,401,379 | 3/1995 | Mazzochi | 205/99 |
| 5,468,532 | 11/1995 | Ho et al. | 428/40 |
| 5,591,819 | 1/1997 | Chou et al. | 528/73 |
| 5,670,599 | 9/1997 | Bassner | 528/59 |
| 5,716,433 | 2/1998 | Aonuma et al. | 106/1.19 |
| 5,780,122 * | 7/1998 | Shirahata et al. | 427/601 |
| 5,856,060 | 1/1999 | Kawamura et al. | 430/201 |

* cited by examiner

*Primary Examiner*—Mohammad Sikder
(74) *Attorney, Agent, or Firm*—Daniel J. Meaney, Jr.

(57) ABSTRACT

A method for forming a metallic mirror surface on a receiving surface, comprises the steps of cleaning the receiving surface to be coated with a metallic mirror surface; spraying on the receiving surface an activating treatment agent containing stannous chloride and at least one precious metal salt of palladium, gold and silver or the like; and separately spraying concurrently on the receiving surface, a reacting metallic salt solution and a reducing agent solution to form the metallic mirror surface. The method may include the step of treating the receiving surface with a water wash treatment. The activating treatment agent may be in a solution form and contain about 10 cc to about 44 cc of hydrochloric acid, about 1.5 g to about 5 g of stannous chloride and about 0.001 g to about 0.005 g of palladium chloride per 1 liter of water.

27 Claims, 2 Drawing Sheets

METHOD FOR FORMING A METALLIC MIRROR SURFACE AND SOLUTIONS FOR THE SAME

BACKGROUND OF THE INVENTION

1. Field of the Invention

This invention relates to a method for forming a metallic mirror surface on a receiving surface, substrate or an article which may be used, as coated, as a decorative object, for making interior decoration ornaments, automobile parts, household electronic appliances, Buddhist altar fittings, furniture, personal accessories and the like and more particularly relates to a method and process employing a spraying based method or process for forming a metallic mirror surface on variety of materials such as metal, synthetic resin, rubber, glass, ceramic wares, wood, leather, stone, plaster, rattan, straw and the like. Solutions, such as activating treatment agent, reacting metal salts including reacting metallic salts and reaction agents are used in the method and processes as disclosed herein.

2. Description of the Prior Art

Chrome plating or spraying of chrome paint on to a receiving surface, substrate or article is known in the art.

One example of a known chromium plating process is disclosed in U.S. Pat. No. 5,401,379 wherein the chromium plating process provides for cleaning and acid treating of a metal article prior to electroplating the acid treated metal article in an electroplating solution.

A wide variety of chrome/aluminum/gold spray paints are known in the art. Several examples of typical chrome and/or aluminum or gold spray paints and the chemical compositions thereof are set forth below in Table 1:

TABLE 1

| Example | Chrome Paint Product | Chemical Composition | |
|---|---|---|---|
| 1 | SKU Number 33873 00503 03-CHROME ALUMINUM-13 | Pigment: | Aluminum Powder 1.88%; |
| | | Vehicle: | Marine Oil, Petroleum Resin Varnish 7.12% |
| | | Propellant | Propane Isobutane 35% |
| | | Other: | Volatile 91%, Alphatic & Hydrocarbons 29.5%, Methylene Chloride 26.50% |
| 2 | Instant Chrome K-Mart Corporation | Pigment: | Aluminum Powder (Type II-Class B) 2. 9; |
| | | Vehicle: | Petroleum Resin 16.2% |
| | | Propellant | Propane Isobutane 30% |
| | | Other: | Aromatic Hydrocarbons 32.2%, Halogentated Hydrocarbons 30% |
| 3 | Hanks Best, Aluminum 1603/ Rust Inhibitor | Pigment: | Aluminum Powder 3.2%; |
| | | Vehicle: | Keytones 15.40% |
| | | Propellant | Propane Isobutane 23% |
| | | Other: | Aromatic Hydrocarbons 51.50%, Xylol Solvent 100% |
| 4 | Coast-to-Coast Metallic Silver S79-44078 | Pigment: | 3.16%; Standard Aluminum Powder 100% |
| | | Vehicle: | None Disclosed |
| | | Propellant | None Disclosed |
| | | Other: | None Disclosed |
| 5 | Rust-Oleum 7270 Gold Rush Metallic | Pigment: | Gold Pigment None Disclosed |
| | | Vehicle: | None Disclosed |
| | | Propellant | None Disclosed |
| | | Other: | None Disclosed |

Conventional methods for chemical plating on plastics such as ABS resins and pretreatment methods for the same are also known in the art. These chemical plating methods involve procedures of first soaking the plastics in an etching solution for 15 minutes to 30 minutes to roughen, abrade or texture the surface, then soaking the etched plastic in stannous chloride containing hydrochloric acid solution bath, washing using water, soaking in activation bath, washing again using water, soaking in plating bath for 5 minutes to 10 minutes, removing from plating bath, washing using water, and drying.

U.S. Pat. No. 3,877,998 discloses a method for treating metal surfaces, preferably after phosphating, with an aqueous solution (preferably acidic) of a melamine-formaldehyde composition and are subsequently dried, preferably by heating. The treatment is a suitable substitute for a conventional chromate rinse.

Bellini Vernici, s.r.l located in Perugia, Italy, offers for sale and sells a wide variety of products for use in car body shops. Certain of these products, referred to as surface refinishing systems, are sold under the trademarks AUTO MAGIC, BODY MAGIC and CLAY MAGIC. These products include non-silicone dressing solutions, lubri-shine solutions, nonacid wheel cleaners, multi-purpose cleaners, body wash, transparent coating referred to a TRAPARENTE M.S., and other coating solutions identified as CATALIZZATORE M.S., DILUENTE M.S. and SOLVENTE ANTISILICONE, all of which are solutions for applying a colored or transparent coating on a motor vehicle or part thereof.

Numerous problems are associated with the known prior art chrome plating processes. One significant problem is the environmental considerations. For example, in known prior art chrome plating processes, ventilation and misting systems are required to protect the workers from and to prevent chrome fumes from emanating into the working and sourrounding environment. Further, workers are required to wear appropriate breathing masks or breathing apparatus when using the process. Elaborate rinsing and capture systems are required to control, capture and dispose of the by-products and spraying residue from a typical chrome plating process.

U.S. Pat. No. 4,221,844 discloses a decoratice coating of metal, such as a chrome plated cold rolled steel, which is accomplished throught the use of a layout fluid used in tool and die work. The layout fluid comprises organic dyes, a wet nitrocellulose vehicle, denatured alcohol solvents, butyl alcohol solvents and a hydrocarbon propellant.

In the above described chemical plating methods for plating plastic or other material receiving surfaces, substrates or articles, the plastic material is soaked in a plating bath at each step of the process and large spaces are required to set up the plating baths. The entire process is also time consuming. Additionally, maintenance requirements and environmental considerations are a factor for driving up the processing costs.

Another problem associate with known prior art chrome/aluminum/gold spray paints is that the spray paints include pigments and vehicles for binding or capturing the pigment such as petroleum resins, and propellants. The quality of the resulting sprayed chrome coated surface is poor and is not metallic mirror like, the coatings contain the petroleum resins as impurities, the paint coating adhesion is minimal and the visual appearance of the spray paints do not rise to the appearance levels attained by typical chrome plating processing of material, substrates or articles.

The use of transparent and colored coatings for motor vehicles and parts thereof wear off, are not permanent coatings and need to be periodically refreshed or replaced to maintain a desired luster coating.

The decorative coating of U.S. Pat. No. 4,221,844 utilizes organic dyes suspended in a liquid vehicle formed of ingredients or elements completely different from the method, process, mixture or paint of the present invention.

SUMMARY OF THE PRESENT INVENTION

The present invention discloses and teaches a new, novel and unique method for forming a metallic mirror surface on a receiving surface. The method comprises the steps of (a) cleaning or otherwise preparing the receiving surface to be coated with a metallic mirror surface; (b) spraying on the receiving surface an activating treatment agent, which may be in solution form, containing stannous chloride and at least one precious metal salt of palladium, gold, silver or the like; and (c) separately spraying concurrently on the receiving surface having the activating treatment agent, a reacting metal salt solution and a reducing agent solution to form the metallic mirror surface.

In addition, a novel and unique hydrochloric acid solution is disclosed and taught herein wherein the solution includes about 10 cc to about 44 cc of hydrochloric acid, about 1.5 g to about 5 g of stannous chloride and about 0.001 g to about 0.005 g of palladium chloride per 1 liter of water for use as an activating treatment agent solution for forming a metallic mirror surface on a receiving surface formed by treating the receiving surface with the above described hydrochloric acid solution, as an activating treatment agent followed by a concurrent application of a reacting metal salt solution and reducing agent solution to form a metallic mirror surface on the receiving surface.

In addition, a novel and unique metal salt solution is disclosed and taught herein wherein the metal salt solution includes about 6.0 g to about 25 g of sodium hydroxide, about 20 g to about 70 g of ammonia and about 2 g to about 20 g of silver nitrate per 1 liter of water for use as a reducing metal salt solution for forming a metallic mirror surface formed by treating receiving surface with an activating treatment agent containing stannous chloride and at least one precious metal salt of palladium, gold, silver and the like followed by a concurrent application of the above described reducing metal salt solution and reducing agent solution to form a metallic mirror surface on the receiving surface.

In addition, a novel and unique reducing agent solution is disclosed and taught herein wherein the reducing agent solution may contain about 1 g to about 4.5 g of tartaric acid, about 10 g to about 50 g of glucose and about 0.05 g to about 3.5 g of formaldehyde for use as a reducing agent for forming a metallic mirror surface formed by treating receiving surface with an activating treatment agent solution containing stannous chloride and at least one precious metal salt of palladium, gold, silver and the like followed by a concurrent application of a reacting metal salt solution and the above described reducing agent to form a metallic mirror surface on the receiving surface.

Also, novel and unique article is disclosed herein having at least a portion of the outer surface thereof coated with a metallic mirror surface and, alternatively, having a primer coating located between the metallic mirror surface and the at least a portion of the outer surface of the article and wherein the silver metal surface comprises a reactant formed by reaction of an activating treatment agent solution containing stannous chloride and at least one precious metal salt of palladium, gold, silver and the like with a reacting metal salt solution and reacting a reducing agent solution.

The so formed metallic mirror surface may have a colored metallic luster formed on at least a portion thereof.

A coating process, a metallic mirror surface coating process, a method for forming a metallic mirror surface on an article and a method of chemically treating an article using the teaching of the present invention are also disclosed herein.

The problem associated with the prior art processes, methods and spray paints are overcome by this invention which employs a method that involves preparing or cleaning the receiving surface or underlay, including, alternatively, coating the receiving surface with an appropriate primer coating material, to facilitate, enhance or promote high adherence or bonding of the metallic mirror surface to the receiving surface or underlay followed by an activating treatment, a water-wash treatment and the reaction of the activating treated with a metal salt solution and reducing agent solution to form a metallic mirror surface.

In the preferred embodiment of the present invention, a metallic mirror surface is formed by an activating treatment that employs a spraying method to spray the activating treatment agent solution containing stannous chloride and precious metal salts of palladium, gold, silver or the like as well as the simultaneous but separate spraying of a metal salt solution and reducing agent solution which combine or react to form the metallic mirror surface.

None of the known prior art method, processes or spray paints anticipate, disclose, teach or suggest a metallic mirror surface being formed by an activating treatment that employs a spraying method to spray the activating treatment agent containing stannous chloride and precious metal salts of palladium, gold and silver or the like as well as the simultaneous but separate spraying of a metal salt solution and reducing agent solution which combined or react to form the metallic mirror surface.

Therefore, one advantage of the method for forming a metallic mirror surface on a receiving surface is that a spray method is employed instead of plating bath to produce a metallic mirror surface on metal, synthetic resin, rubber, glass, ceramic wares, wood, leather, stone, plaster rattan, straw and the like.

Another advantage of the present invention is that problems associated with the prior plating process and spray paints are using in lieu thereof the method for forming metallic mirror surface on metal, synthetic resin, rubber, glass, ceramic wares, wood, leather, stone, plaster, rattan, straw and the like.

Another advantage of the present invention is that activating treating agents my contain about 10 cc to about 44 cc of hydrochloric acid, about 1.5 g to about 5 g of stannous chloride and about 0.001 g to about 0.005 g of palladium chloride per 1 liter of water Another advantage of the present invention is that activating treating agents my be in form of a hydrochloric acid solution which includes about 10 cc to 44 cc of hydrochloric acid, about 1.5 g to about 5 g of stannous chloride and about 0.001 g to about 0.005 g of palladium chloride per 1 liter of water for use as an activating treatment agent solution for forming a metallic mirror surface on a receiving surface formed treated, which alternatively could be prepared with primer coating, wherein the receiving surface is treated with the hydrochloric acid solution as an activating treatment agent followed by a concurrent application of a reacting metal salt solution and reducing agent solution to form a metallic mirror surface on the receiving surface.

Another advantage of the present invention is that a metal salt may include about 6.0 g to about 25 g of sodium hydroxide, about 20 g to about 70 g of ammonia and about 2 g to about 20 g of silver nitrate per 1 liter of water for use with a reducing agent solution for forming a metallic mirror surface on a receiving surface wherein the receiving surface is then treated with an activating treatment agent solution containing stannous chloride and at least one precious metal salt of palladium, gold, silver or the like followed by a concurrent application of a reacting metal salt and reducing agent solution having about 1 g to about 4.5 g of tartaric acid, about 10 g to about 50 g of glucose and about 0.05 g to about 3.5 g of formaldehyde to form a metallic mirror surface on the receiving surface.

Another advantage of the present invention is that a coating process using the teachings of the present invention may be used for forming a metallic mirror surface on the receiving surface of a substrate.

Another advantage of the present invention is that a metallic mirror surface coating process using the teachings of the present invention may be used for forming a metallic mirror surface on part of a receiving surface or on the entire surface of a wide variety of materials such as metals, plastics, glasses, ceramics, woods, decorative items, furniture, motor vehicles, motor cycles, motor vehicle components and parts, or flat, curved or shaped objects, articles or the like.

Another advantage of the present invention is that the teachings of the present invention may be used in a method for forming a metallic mirror surface on an article.

Another advantage of the present invention is that the teachings of the present invention may be used in a method for chemically treating an article by forming a metallic mirror surface on an article.

Another advantage of the present invention is that the teachings of the present invention can be used for fabrication of an article having at least a portion of the outer surface thereof coated with a metallic mirror surface and, preferably having a primer coating located between the metallic mirror surface, the at least a portion of the outer surface of the article wherein the silver metal surface comprises a reactant formed by reaction of an activating treatment agent containing stannous chloride and at least one precious metal salt of palladium, gold, silver or the like with a reacting metal salt and a reducing agent.

Another advantage of the present invention is that an article having a metallic mirror surface fabricated by using the teachings of the present invention may have a colored metallic luster formed on at least a portion thereof.

A still yet another advantage of the present invention is that a wide variety of treatment agents, preferably in solution form, may be used in the method disclosed and taught herein.

A still yet another advantage of the present invention is that a novel method of forming chrome-like metallic mirror surface on an article, a substrate or any type of receiving surface, which may have been treated with an appropriate primer coating, may be achieved using the teachings of the invention as disclosed and taught herein.

BRIEF DESCRIPTION OF THE DRAWINGS

The foregoing and other advantages of this invention will be apparent from the following description of the preferred embodiment of the invention when considered with the illustrations and accompanying drawings, which include the following Figures.

DESCRIPTION OF THE PREFERRED EMBODIMENT

Figure 1:
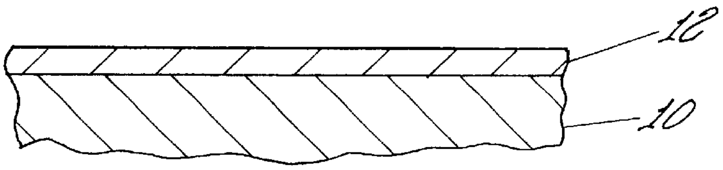
FIG. 1 is a pictorial representation of a receiving surface having a metallic mirror surface formed thereon.

The present invention employs a method for forming a metallic mirror surface that involves adjustment of an underlay that forms the metallic mirror surface, applying an activating treatment and then applying a water-wash treatment to the underlay, followed by a reaction to reacting metal salt and reducing agent to form the metallic mirror surface. An activating treatment, including an activating treatment agent solution, containing stannous chloride and precious metal salts of palladium, gold, silver and the like is sprayed on the substrate, surface or article which is to have a metallic mirror surface formed thereon. The method includes the simultaneous but separate spraying of separate solutions forming the activating reaction treatment agent as well as two separate solutions forming a metal salt solution and reducing agent solution.

Further, this invention discloses and teaches a hydrochloric acid solution which contains contain about 10 cc to about 44 cc of hydrochloric acid, about 1.5 g to about 5 g of stannous chloride and about 0.001 g to about 0.005 g of palladium chloride per 1 liter of water and which is employed as the activating-treatment agent in the method for forming a metallic mirror surface.

Additionally, the method may employ or utilize a metallic mirror reaction treatment agents comprising a metal salt solution containing about 6.0 g to about 25 g of sodium hydroxide, about 20 g to about 70 g of ammonia and about 2 g to about 20 g of silver nitrate per 1 liter of water and a reducing agent solution containing about 1 g to about 4.5 g of tartaric acid, about 10 g to about 50 g of glucose and about 0.05 g to about 3.5 g of formaldehyde.

Precious metal salts are well known to persons skilled in the art and include valuable metals such as gold, silver, palladium and members of the platinum group. The term "precious metal salts" and the term at least one precious metal salt of palladium, gold, silver and the like" as used herein is intended to include all precious metal salts formed from such precious metals. The color or hue of the metallic mirror is determined by the precious metal salt used in forming the same, and may be silver, gold or other appropriate color.

The method or process involves adjustment of or treatment of an underlay or receiving surface, such as by cleaning or otherwise preparing the underlay or receiving surface as required, or alternatively by applying a primer coating to the receiving surface, substrate or article, which is to have the metallic mirror surface formed thereon and applying an activating treatment and then a water-wash treatment to the underlay, receiving surface, substrate or article, followed by a reaction to metal salt and reducing agent to form the metallic mirror surface. The activating treatment is performed preferably by the step of spraying the activating-treatment agent in a solution form containing stannous chloride and precious metal salts of palladium, gold, silver and the like. However, it is envisioned that other known steps for applying a solution may be used herein, such as passing the receiving surface, substrate or article through a mist curtain or other known fluid distribution, treatment apparatus or processing procedures. This step is followed by the simultaneous but separate spraying of metallic mirror reaction treatment agents comprising a metal salt solution and a reducing agent solution.

This invention also teach that: (i) the activating treatment agent, which preferably is an activating treatment solution, may contain about 10 cc to about 44 cc of hydrochloric acid, about 1.5 g to about 5 g of stannous chloride and about 0.001 g to about 0.005 g of palladium chloride per 1 liter of water; (ii) the reacting metallic salt solution may contain about 6.0 g to about 25 g of sodium hydroxide, about 20 g to about 20 g of silver nitrate per 1 liter of water; and (iii) the reducing agent solution may containing about 1 g to about 4.5 g of tartaric acid, about 10 g to about 50 g of glucose and about 0.05 g to about 3.5 g of formaldehyde, all of which are employed as the metallic mirror reaction treatment agents in the method for forming a metallic mirror surface using the above described method steps.

In the pictorial representation of FIG. 1, a receiving surface 2, which may be a surface of a metal article, for example, is shown having a metallic mirror surface 12 formed thereon using the method, process, solutions and teaching of the present invention.

In order to obtain better adhesion between the metallic mirror surface and the receiving surface, which may be a substrate, an article or the like the receiving surface any first be treated, sprayed or otherwise coated or have formed thereon, by sputtering or vapor deposition as an example, a primer coating of an adhesion enhancing coating.

Figure 2:
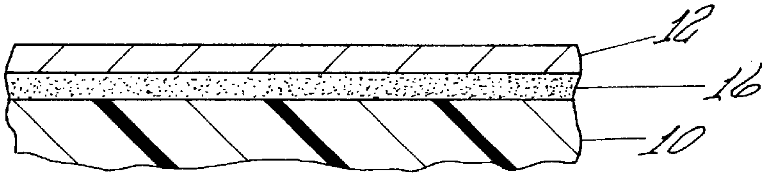
FIG. 2 is a pictorial representation of a receiving surface having a primer coating located between a metallic mirror surface and a receiving surface to enhance adhesion therebetween.

FIG. 2 represents in a pictorial representation of a receiving surface 10 having a primer coating 16 located between the metallic mirror surface 12 and the receiving surface 10 wherein the receiving surface is of a plastic article, as an example.

Figure 3:
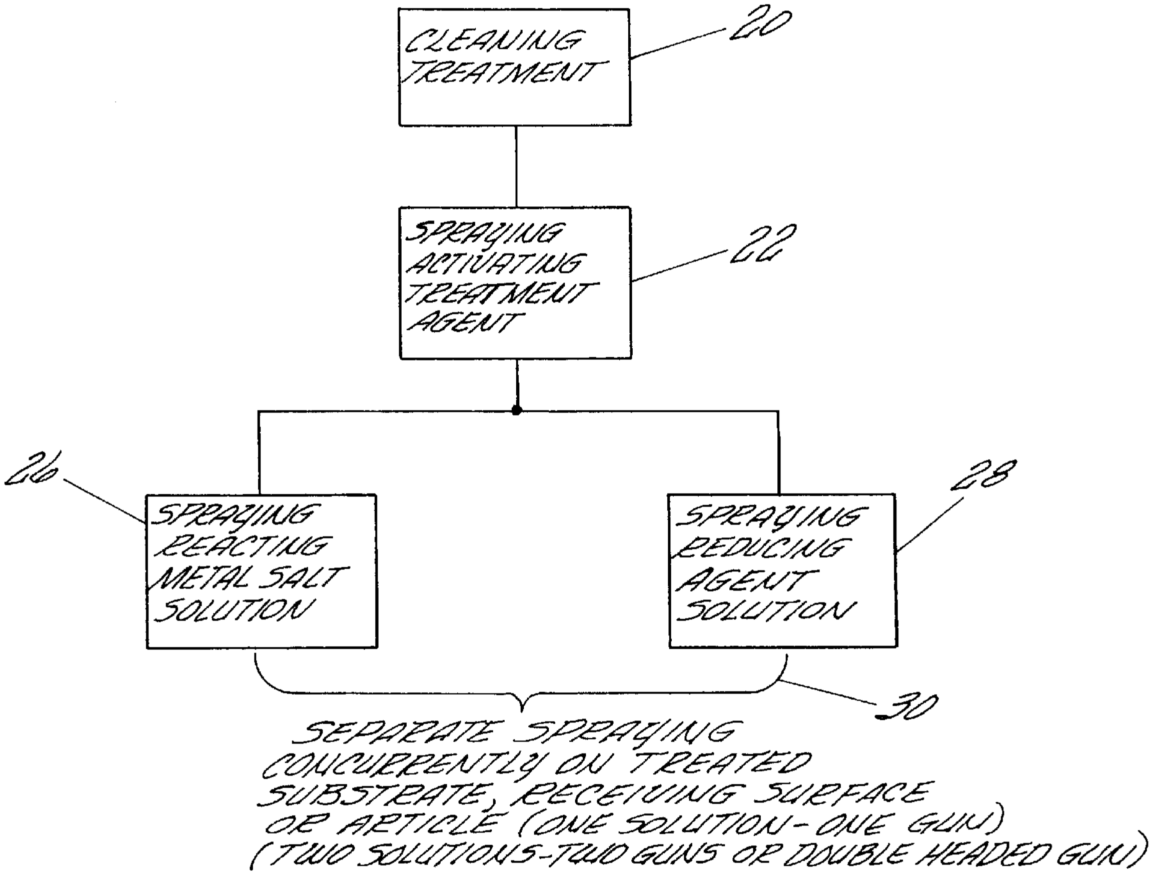
FIG. 3 is a block diagram showing the steps of the methods, process and an article formed thereby using the teachings of the present invention.

FIG. 3 is a block diagram showing the basic steps of the methods, process and an article formed thereby using the teachings of the present invention and the method or process includes the steps of: (a) cleaning the receiving surface to be coated with a metallic mirror surface as depicted by box 20 labeled "Cleaning Treatment"; (b) spraying on the receiving surface an activating treatment agent solution containing stannous chloride and at least one precious metal salt of palladium, gold, silver or the like as depicted by box 22 labeled "Spraying Activating Treatment Agent"; and (c) separately spraying concurrently on the receiving surface having the activating treatment agent a reacting metal salt solution and a reducing agent solution to form the metallic mirror surface as depicted by box 26 labeled "Spraying Reacting Metal Salt Solution" and 28 labeled "Spraying Reducing Agent solution", and the separate spraying concurrently on the treated substrate or receiving surface is shown as 30. The reacting metal salt solution and a reducing agent solution may be mixed as one solution, placed into a pressurized spray container or tank and sprayed on the receiving surface using a single spray gun. Alternatively, the reacting metal salt solution and a reducing agent solution may be maintained as two separate and independent solutions each of which are placed into separate pressurized spray containers or tanks and which are sprayed on the receiving surface using two spray guns or a double-headed spray gun.

Figure 4:
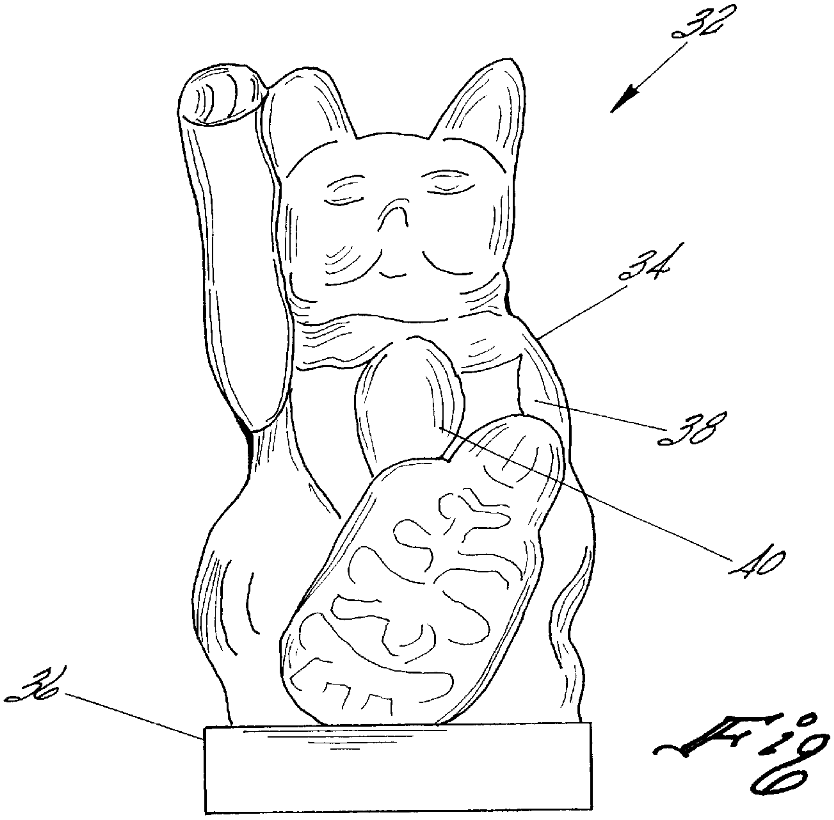
FIG. 4 is a pictorial representation of an article having a metallic mirror surface and a colored metallic luster on at least a portion thereof formed using the teachings of the present invention.

FIG. 4 is a pictorial representation of an article shown generally as 32 in the form of ceramic bear figurine 34 mounted on a base 36 after a metallic mirror surface has been formed on the outer surface of the ceramic bear figurine 34. The ceramic bear figurine 34 having the metallic mirror surface 38 formed thereon includes a decorative element in the form of a colored metallic luster 40 on at least a portion the metallic mirror surface formed using the teachings of the present invention.

The article 32 has at least a portion of its outer surface thereof coated with a metallic mirror surface 38. A primer coating, shown as 16 in FIG. 2, may be located between the metallic mirror surface 38 and the at least a portion of the outer surface of said article 32 to enhance adherence of the metallic mirror surface to the ceramic bear figurine 34.

The silver metal surface 38 comprises a reactant formed by reaction of an activating treatment agent solution containing stannous chloride and at least one precious metal salt of palladium, gold, silver or the like with a reacting metal salt solution and a reducing agent solution.

The a decorative element in the form of a colored metallic luster 40 may be formed by subsequent method steps comprising the step of: (a) preparing a paint containing a mixture of polyol, polyisocyanate and at least one of an organic pigment and dye as a coloring agent; and (b) spraying the paint onto a selected portion of the article 32 having the chemically treated metallic luster in the form of the metallic mirror surface 38 and permitting the polyol and polyisocyanate to curingly react with each other to hardness form a metallic luster a colored polyurethane coating having a metallic luster on the receiving surface having metallic mirror surface.

Figure 5:
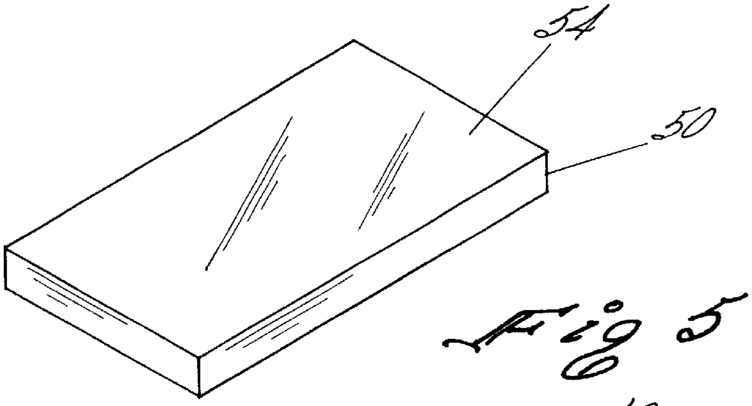
FIG. 5 is a pictorial representation of a substrate having a metallic mirror surface formed thereon using the teachings of the present invention.

FIG. 5 is a pictorial representation of a substrate or article 50 having a metallic mirror surface 54 formed thereon using the teachings of the present invention. The substrate or article, or a portion thereof, may be used as a mirror, or as decorative element or the substrate or article could be cut into pieces which could be used directly as parts or be used as subassembly components that are used in the assembly of a product, or accessory or furniture, such as for example a desk, or the like enabling that the assembled product, accessory or furniture or article to have, on at least a portion thereof, a metallic mirror surface.

Figure 6:
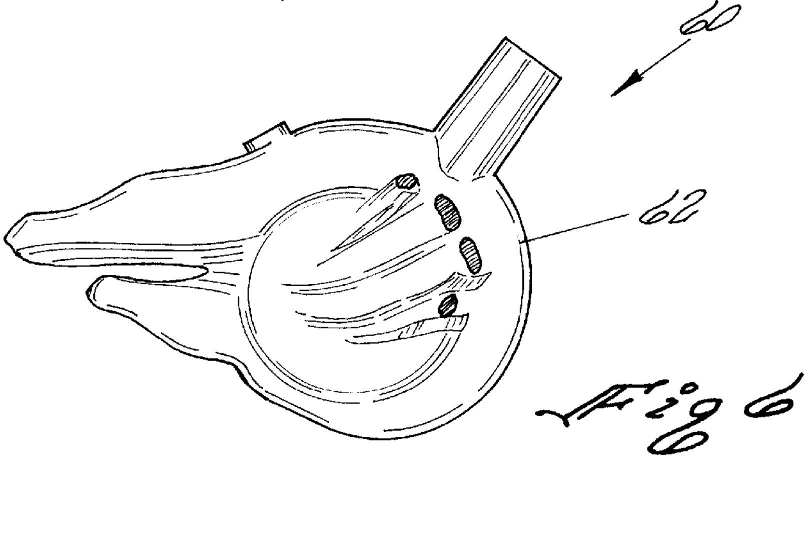
FIG. 6 is a pictorial representation of a motor vehicle part in the form of a motor cycle cover having a metallic mirror surface formed thereon using the teachings of the present invention.

FIG. 6 is a pictorial representation of a motor vehicle part in the form of a motor cycle cover 60 having a metallic mirror surface 62 formed thereon using the teachings of the present invention.

As is evident from the above, the method, process and article formed thereby represents a significant improvement over the known chrome plating and chrome painting processes and methods. In the methods and processes disclosed herein, in the preferred embodiment, stannous chloride is used for activation treatment. The stannous chloride turns into stannous ion, a reducer, in hydrochloric acid solution, while precious metal salts of palladium, gold, silver and the like turn into metallic ions in the solution.

When both solutions are sprayed on a receiving surface, substrate or article using a spraying or equivalent solution application processing step as described herein before, the precious metal ions are reduced and precipitate on to the receiving surface, substrate or article as metal deposits. Stannous ion is oxidized by the stannic ion. The metal deposits, especially palladium, are very active and they are excellent for making metallic mirror surface and adhere aggressively to the receiving surface, substrate or article.

Soaking the receiving surface, substrate or article in stannous chloride solution and the activation treatment that involves soaking in the precious metal salts solution are preferably carried out in two separate steps. This invention teaches an extremely efficient method for forming a metallic mirror on a receiving surface in that it not only combines the two procedures into one, but the method and process also employs, preferably, a spraying method that allows instant areaction to take place and immediately deposits metals on the article, substrate or receiving surface.

Furthermore, by spraying a metal salt solution and a reducing agent solution using a spraying method, preferably, free metals reduced by the reducing agent solution will adhere to the article, substrate or receiving surface, which has been activated by the aforementioned palladium, for example. In this case, the reaction is allowed to take place after spraying solutions on the article, substrate or receiving surface using spray method, as a preferred treatment step, The reaction takes place instantly, precipitating metal deposits on the receiving surface, substrate or article. This is significantly different than the reactions that take place consecutively in a prior art still solution in a plating bath.

The following are examples of materials, articles and objects which can be treated using the method for forming a metallic mirror surface. Substrates that can be used for having a metallic mirror surface formed thereon can be, without limitation, any one of the following articles, objects or materials, e.g. metal, synthetic resin, rubber, glass, ceramic wares, wood, leather, stone, plaster, rattan, straw and the like.

The underlay or receiving surface, substrate or article is adjusted or prepared by cleaning the same using detergent and then water is to remove any debris, oil residues or fingerprints. This also improve the wettability so that metallic mirror surface can be formed evenly.

If necessary, a layer of synthetic resin may be formed on the substrate surface by coating the substrate surface with synthetic resin such as urethane resin or acrylic resin using a spray method, preferably. Additionally, it may desirable to roughen the surface of synthetic resin layer surface, by spraying it with etching solution, such as for example, anhydrous chromic acid, sulfuric acid or phosphoric acid normally used the in pretreatment process for plastic plating in order to improve the adherence of the subsequent metal layer.

In the preferred embodiment, the activating-treatment agent may, as mentioned above, be a solution containing about 10 cc to about 44 cc of hydrochloric acid, about 1.5 g to about 5 g of stannous chloride and about 0.001 g to about 0.005 g of palladium chloride per 1 liter of water. It is desirable to use an appropriate concentration within this range. The optimum concentration is determined based primarily on the treatment temperature. Since the reaction takes place more rapidly in the summer, a low concentration of treatment agent is desirable, while a high concentration of treatment agent is preferable to off set the slow reaction rate in winter.

A conventional spray gun attached to a pressurized tank may preferably be used for spraying the activating-treatment agent solution. Spraying coats the entire area evenly and thoroughly. One or two layers of spray may be required, depending on the shape and surface condition of the article, substrate or receiving surface.

Alternatively, instead of using an one-solution type activating-treatment agent, a hydrochloric acid solution containing stannous acid and a hydrochloric acid containing palladium can each be placed in separate pressurized tanks for a simultaneous spray application using double spray guns or a two-head spray gun.

After spraying the activating agent, a water treatment washing is procedure is performed while the substrate is still wet. Spraying the receiving surface, substrate or article with clean water using a spraying process effectively removes residues from the previous process and avoids contaminating the activated surface formed in the previous process. It is desirable to use purified water that contains few minerals or, if possible, distilled water or ion-exchange water for cleaning.

After the cleaning process, the next step of applying the metallic mirror reaction agents, preferably by the spraying process which is performed while the substrate is still wet. The reacting metal salt solution and reducing agent solution may each be placed in separate pressurized tanks, and spray solutions are sprayed on the article, substrate or receiving surface simultaneously using a double-gun, a two-head gun or a sprayer.

As with the aforementioned activating treatment, it is desirable to select an appropriate formulation (concentration) for the solutions, it being noted that the given solution ranges disclosed hereinbefore are preferable. Additionally, substituting the solution continuing silver nitrate, as described in the above formulation, with cupric sulfate or nickel sulfate solution will yield a copper or nickel metallic mirror surface (mirror surface). The related mirror surface forming method and cupric sulfate or nickel sulfate solution are also included as part of this invention.

The following EXAMPLE 1 teaches the use of the present invention in a method for forming a metallic mirror surface on a receiving surface.

EXAMPLE 1

The first layer is sprayed evenly from the bottom and is sprayed so as to coat the substrate surface until a silver color begin to appear and the spraying is finished at the top of the substrate. Furthermore, from a position a little further away from the substrate, repeatedly apply spray to the substrate from top to bottom at an interval of 10 seconds to 20 seconds for a total of four times. The numbers of layers of spray can be appropriately increased or reduced depending on the surface condition or the shape of substrate.

After the metallic mirror reaction treatment agents spraying process, clean the sprayed surface again to remove mist or solvent from the previous process. The residual moisture is removed by air jet, and he surface is dried using a heater for 10 to 20 minutes until it is completely dry.

The above are the primary processes for forming a metallic mirror surface. It is envisioned that a coat of transparent clear coating or transparent colored coating could be applied by spray method to the finished metallic mirror surface to yield a premium quality ornament as though it has received a color-gloss-plating. A transparent clear coating may include a UV blocking agent.

The following EXAMPLES 2 through 5 are representative working examples that illustrate the method of forming a metallic mirror surface and metal salt solutions related to this invention. EXAMPLE 2 illustrates the preparation of activating-treatment agent solution. EXAMPLE 3 shows the preparation of metallic mirror reaction treatment agent solution. Additionally, EXAMPLES 3, 4 and 5 are examples related to forming a metallic mirror surface.

EXAMPLE 2

Anhydrous stannous chloride is dissolved in appropriate concentration of hydrochloric acid to yield a stannous chloride hydrochloric acid solution. Next, the anhydrous palladium chloride is dissolved in an appropriate concentration of hydrochloric acid to yield a palladium chloride hydrochloric acid solution. The two hydrochloric acid solutions are mixed together right just prior to use and the mixture is placed into a pressurized tank for spraying. Alternatively, the two hydrochloric acid solutions may be each placed in a separate pressurized tank and sprayed simultaneously using a double-head gun or a double-gun.

EXAMPLE 3

A sodium hydroxide water solution is added to a silver nitrate water solution that has been added with ammonia to yield a metallic salt solution at the specified concentration. Formaldehyde is added to a mixture of tartaric acid and glucose water solution to yield a reducing agent solution. The two solutions, the metallic mirror reaction treatment agents, are each placed in a separate pressurized tanks and sprayed simultaneously using a double-head gun or a double-spray guns.

EXAMPLE 4

A steel substrate is cleaned by spraying the same with purified water and an activating treatment agent, prepared in Example 2 above is sprayed on to and activating the substrate surface. After washing the substrate surface with water, spray the metallic mirror reaction agent prepared in Example 2 is sprayed on the substrate surface to form a metallic mirror surface. The metallic mirror surface is washed with water and dried to yield a glossy metallic mirror surface.

An acrylic resin based clear coating may be spray coated on the metallic mirror surface to yield a glistening silver ornament.

EXAMPLE 5

An ABS resin substrate is roughed up using an etching solution consists of anhydrous chromic acid, sulfuric acid and phosphoric acid. The metallic mirror surface is then formed thereon in the same manner as in Example 4. A coating comprising a mixture of polyol and polyisocyanate, having added thereto an organic pigment as colorant, is sprayed on the metallic mirror surface. A colored polyurethane membrane is formed to yield an ornament with a brilliant metallic gloss.

The following EXAMPLE 6 discloses and teaches the procedure for preparing the various solutions for practicing this invention as well as the process steps to produce a desirable metallic mirror surface on a receiving surface, substrate or article.

The following is an example of a metallic mirror surface coating process using pre-mixed solutions.

EXAMPLE 6

I. Prepare "Sensitizer" Solution

| Step | Description | Procedure |
|---|---|---|
| 1 | Prepare Sensitizer Base | Dissolve 0.1 gm of Palladium (II) Chloride with 20.0 gm of Hydrochloric Acid |
| 2 | Add | 5,000 cc Aqua Purificate (Pure Water 99.9%) to Sensitizer |

II. Prepare "Sensitizer-A"

| Step | Description | Procedure |
|---|---|---|
| 1 | Use Sensitizer Solution | Mix 100 mg of Sensitizer Solution with 5000 cc of Aqua Purificate (Pure Water 99.9%) and with the following amounts of Hydrochloric Acid depending on the season:<br>(a) Summer-Temperature-over 26° C. - 25 gm<br>(b) Spring or Fall-Temperature-over 20° C. to 26° C. - 50 gm<br>(c) Winter Temperature-under 20° C. - 75 gm |
| 2 | add Tin (II) Chloride Anhydrous | Mix 3.0 gm of Tin (II) chloride Anhydrous (CAS#100265-69-1) into above mixture (1.000 g); Shake Gently 3 or 4 times; Perform Step 2 mixing with 72 hours of use; when mixed, good for a maximum of 72 hours |

III. Prepare "Formula Plating-A"

| Step | Description | Procedure |
|---|---|---|
| 1 | Prepare Plating-A Mixture | Mix 4,750 cc of Aqua Purificate (Pure Water 99.9%) and with 12.5 gm of Silver Nitrate ($AgNo_3$) (CAS#7761-88-8) and 240 cc of Ammonia; Shake Well until completely dissolved |

-continued

| Step | Description | Procedure |
| --- | --- | --- |
| 2 | add Sodium Hydroxide | Add to above mixture 37.5 gm of Sodium Hydroxide (NaOH); Shake Well until completely dissolved |

IV. Prepare "Formula Plating-B"

| Step | Description | Procedure |
| --- | --- | --- |
| 1 | Prepare Plating-B Mixture | Mix 5,000 cc of Aqua Purificate (Pure Water 99.9%) and with 15 gm of L(+) Tartaric Acid (CAS#50-99-7) and 150 mg of D(+) Glucose; Shake Well Immediately |
| 2 | add Formaldehyde Solution | Add to above mixture the following amounts of Formaldehyde Solution (CAS#50-00-0) depending on the season: (a) Summer-Temperature-over 26° C.-7.0 gm (b) Spring or Fall Temperature-over 20° C. to 26° C.-9.0 gm (c) Winter Temperature-under 20° C.-11.0 gm; Shake Well |

V. Metallic mirror Surface Coating Process

| Step | Description | Procedure |
| --- | --- | --- |
| 1 | Cleaning a receiving surface | Clean the receiving surface by removing debris, dirt, fingerprints and the like |
| 2 | Adjusting underlay or receiving surface (Preparation Process) | a) Spray "Regular Primer"* on article or receiving surface to be coated with a metallic mirror surface [Regular Primers for various articles are available in the market);** b) Dry Naturally 10 min to 60 min; c) Spray "Adhesion Primer" to receiving surface, substrate or article;*** d) Dry with Air Blow for 2 hours (50° C.); Cool for 60 min. |
| 3 | Metallic mirror Coating Process [Applies to receiving surface, substrate or article, as the case may be] | a) Spray Sensitzer; b) Spray Washing with Pure Water; c) Spray "Plating-A" two or three times; d) Spray "Plating-B" one or two times; e) Dry with Air Blow for 10 min to 20 min (50° C.); f) Spray "Protective Coating" (Sealant); g) Dry with Air Blow for 10 min to 20 min (50° C.); h) Spray color clear coating (any color) i) Dry with Air Blow for 10 min to 20 min (50° C.); j) Spray "UV cut Clear Coating k) Dry with Air Blow for 60 min (50° C.); l) Dry Naturally; |

*One Example of a "Regular Primer" is Micchakuron Multi", a multipurpose primer made by a Japanese company, TEROSON CORPORATION CO, LTD, 2100-79, Kamiyashiba, Satte City, Saitama, Japan 340-0121
**Materials are Steel, Plastic, Aluminum, ABS, P.P., Glass, Ceramic Wood [Ceramic and Wood must be percolate prevented/treated before applying primer; Ceramic must be glazed; Wood has to be treated with a polishing compound]; Any material that is treated and coated with two component polyurethane paint
***"Adhesion Primer" may be Kansai Paint Brand "Retan Clear 1" that will maximize adhesion between receiving surface, substrate or article and chrome base coating e.g. the metallic mirror surface; Source: Kansai Paint Co., LTD, 3-6 Fushimi-machi, 4-chome, Chuo-Ku, Osaka, Japan 541-8523;

The method and process disclosed and taught herein employs simple spraying devices, as described in the aforementioned spray method, and simplified procedures to yield a glossy metallic mirror surface in a short period of time. Bulky equipment as used in conventional plating and spraying steps are not required. Not only is the superior method economical, but the method also yields or provides an excellent result yielding a beautiful metallic mirror surface rich in gloss equivalent to that produced by plating method.

The method is valuable because it can be used to apply a metallic mirror surface on a wide range of substrates such as metal, synthetic resin, rubber, glass, ceramic wares, wood, leather, stone, plaster, rattan, straw and the like.

Furthermore, it is envisioned that an additional step of applying a coat of transparent coloring coating or clear coating to the metallic mirror surface will yield an ornament and novel appearance that is extremely articulate and impressive. The metallic mirror surface prepared in accordance with the teachings of the present invention has high durability and an article or object coated therewith can be used in outdoor environment without significant deterioration.

All such variations and incorporating of the teachings of the present invention are envisioned to be covered by and anticipated by the teachings set forth herein.

What is claimed is:

1. A method for forming a metallic mirror surface on a substrate comprising the steps of spraying the substrate with an activating-treatment agent in a solution wherein said an activating-treatment agent solution contains about 10 cc to about 44 cc of hydrochloric acid, about 1.5 g to about 5 g of stannous chloride and about 0.001 g to about 0.005 g of a precious metal salt of at least one of a silver nitrate, palladium chloride, gold chloride and platinum chloride per 1 liter of water; and simultaneously and separately spraying the substrate with metallic mirror reaction treatment agents comprising of a reacting metal salt solution and a reducing agent solution.

2. The method of claim 1 wherein the step of spraying the substrate with an activating-treatment agent includes an activating-treatment agent solution containing about 10 cc to about 44 cc of hydrochloric acid, about 1.5 g to about 5 g of stannous chloride and about 0.001 g to about 0.005 g of palladium chloride per 1 liter of water.

3. The method of claim 1 wherein the step of simultaneously and separately spraying the substrate with metallic mirror reaction treatment agents includes a metallic mirror reaction treatment agent comprising of a reacting metal salt solution containing about 6.0 g to about 25 g of sodium hydroxide, about 20 g to about 20 g of silver nitrate per 1 liter of water.

4. The method of claim 1 wherein the step of simultaneously and separately spraying the substrate with metallic mirror reaction treatment agents includes a reducing agent solution comprising about 1 g to about 4.5 g of tartaric acid, about 10 g to about 50 g of glucose and about 0.05 g to about 3.5 g of formaldehyde.

5. The method of claim 1 wherein the step of spraying the substrate with an activating-treatment agent includes using a single solution type activating-treatment agent and spraying the solution as a single solution.

6. The method of claim 5 wherein the spraying the solution as a single solution includes using a single spray gun.

7. The method of claim 3 wherein the step of spraying the activating-treatment agent solution includes using a two solution activating-treatment agent comprising a hydrochloric acid solution containing stannous acid and a hydrochloric acid solution containing palladium and simultaneously spraying the same as two separate solutions.

8. The method of claim 7 wherein the simultaneously spraying the same as two separate solutions includes using two spray guns.

9. The method of claim 7 wherein the simultaneously spraying the same as two separate solutions includes using a two headed spray gun.

10. The method of claim 1 wherein the step of spraying the substrate with a metal salt solution and a reducing agent solution includes using a single solution and spraying the solution as a single solution.

11. The method of claim 10 wherein the spraying the solution as a single solution includes using a single spray gun.

12. The method of claim 10 wherein the simultaneously spraying the same as two separate solutions includes using a two headed spray gun.

13. The method of claim 1 wherein the step of spraying the substrate with a metal salt solution and a reducing agent includes using two separate solutions and simultaneously spraying the same as two separate solutions.

14. The method of claim 13 wherein the step of spraying two separate solutions includes using two spray guns.

15. A method for forming a metallic mirror surface on a receiving surface comprising the steps of cleaning the receiving surface to be coated with a metallic mirror surface;

spraying on the receiving surface an activating treatment agent wherein said an activating-treatment agent solution contains about 10 cc to about 44 cc of hydrochloric acid, about 1.5 g to about 5 g of stannous chloride and about 0.001 g to about 0.005 g of a precious metal salt of at least one of a silver nitrate, palladium chloride, gold chloride and platinum chloride per 1 liter of water; and separately spraying concurrently on the receiving surface having said activating treatment agent aireacting metal salt and a reducing agent to form the metallic mirror surface.

16. The method of claim 15 after the step of spraying on the receiving surface an activating treatment agent further comprising the step of treating said receiving surface having said activating treatment agent with a water wash treatment.

17. The method of claim 15 wherein the step of spraying on the receiving surface with an activating treatment agent includes spraying an activating treatment agent in solution form containing about 10 cc to about 44 cc of hydrochloric acid, about 1.5 g to about 5 g of stannous chloride and about 0.001 g to about 0.005 g of palladium chloride per 1 liter of water.

18. The method of claim 15 wherein the step of separately spraying concurrently on the receiving surface having said activating treatment agent includes spraying concurrently a reacting metal salt solution containing about 6.0 g to about 25 g of sodium hydroxide, about 20 g to about 20 g of silver nitrate per 1 liter of water to form the metallic mirror surface.

19. The method of claim 15 wherein the step of separately spraying concurrently on the receiving surface having said activating treatment agent includes spraying concurrently a reacting agent solution containing about 1 g to about 4.5 g of tartaric acid, about 10 g to about 50 g of glucose and about 0.05 g to about 3.5 g of formaldehyde to form the metallic mirror surface.

20. A method for forming a metallic mirror surface on an article comprising the steps of:

cleaning said article to form a cleaned article to be coated with a metallic mirror surface;

spraying on the cleaned article an activating treatment agent solution wherein said an activating-treatment agent solution contains about 10 cc to about 44 cc of hydrochloric acid, about 1.5 g to about 5 g of stannous chloride and about 0.001 g to about 0.005 g of a precious metal salt of at least one of a silver nitrate, palladium chloride, gold chloride and platinum chloride per 1 liter of water;

spraying said article having said activating treatment agent with a water wash treatment; and separately spraying concurrently on the article after treatment with said activating treatment agent a reacting metal salt solution and a reducing agent solution to form on the article a metallic mirror surface.

21. The method of claim 20 after the step of cleaning said article the step of:

spraying a primer coating on the cleaned article.

22. The method of claim 20 further comprising the step of preparing a paint containing a mixture of polyol, polyisocyanate and at least one of an organic pigment and dye as a coloring agent; and spraying said paint onto a selected portion of said article having said metallic mirror surface and permitting said polyol and polyisocyanate to curingly react with each other to hardness to form a colored polyurethane coating having a metallic luster.

23. The method of claim 20 further comprising after said metallic mirror surface is formed on said article the step of:

spraying the article with a water treatment.

24. A method of chemically treating an article comprising the steps of:

cleaning said article to form a cleaned article to be chemically treated;

spraying on the cleaned article an activating treatment agent solution wherein said an activatin treatment agent solution contains about 10 cc to about 44 cc of hydrochloric acid, about 1.5 g to about 5 g of stannous chloride and about 0.001 g to about 0.005 g of a precious metal salt of at least one of a silver nitrate, palladium chloride, gold chloride and platinum chloride per 1 liter of water;

spraying said article having said activating treatment agent with a water wash treatment; and separately spraying concurrently on the article after treatment with said activating treatment agent a reacting metal salt solution and a reducing agent solution to form on the article a chemically treated metallic luster.

25. The method of claim 24 further comprising the step of preparing a paint containing a mixture of polyol, polyisocyanate and at least one of an organic pigment and dye as a coloring agent; and spraying said paint onto a selected portion of said article having a chemically treated metallic luster and permitting said polyol and polyisocyanate to react with each other to form on said chemically treated metallic luster a colored polyurethane coating having a metallic luster.

26. The method of claim 24 further comprising after said chemically treated metallic luster is formed on said article the step of:

spraying the article with a water treatment.

27. The method of claim 24 further comprising after said chemically treated metallic luster is formed on said article the step of:

spraying the article with a transparent clear coating having a UV blocking agent.

* * * * *